Patented June 10, 1924.

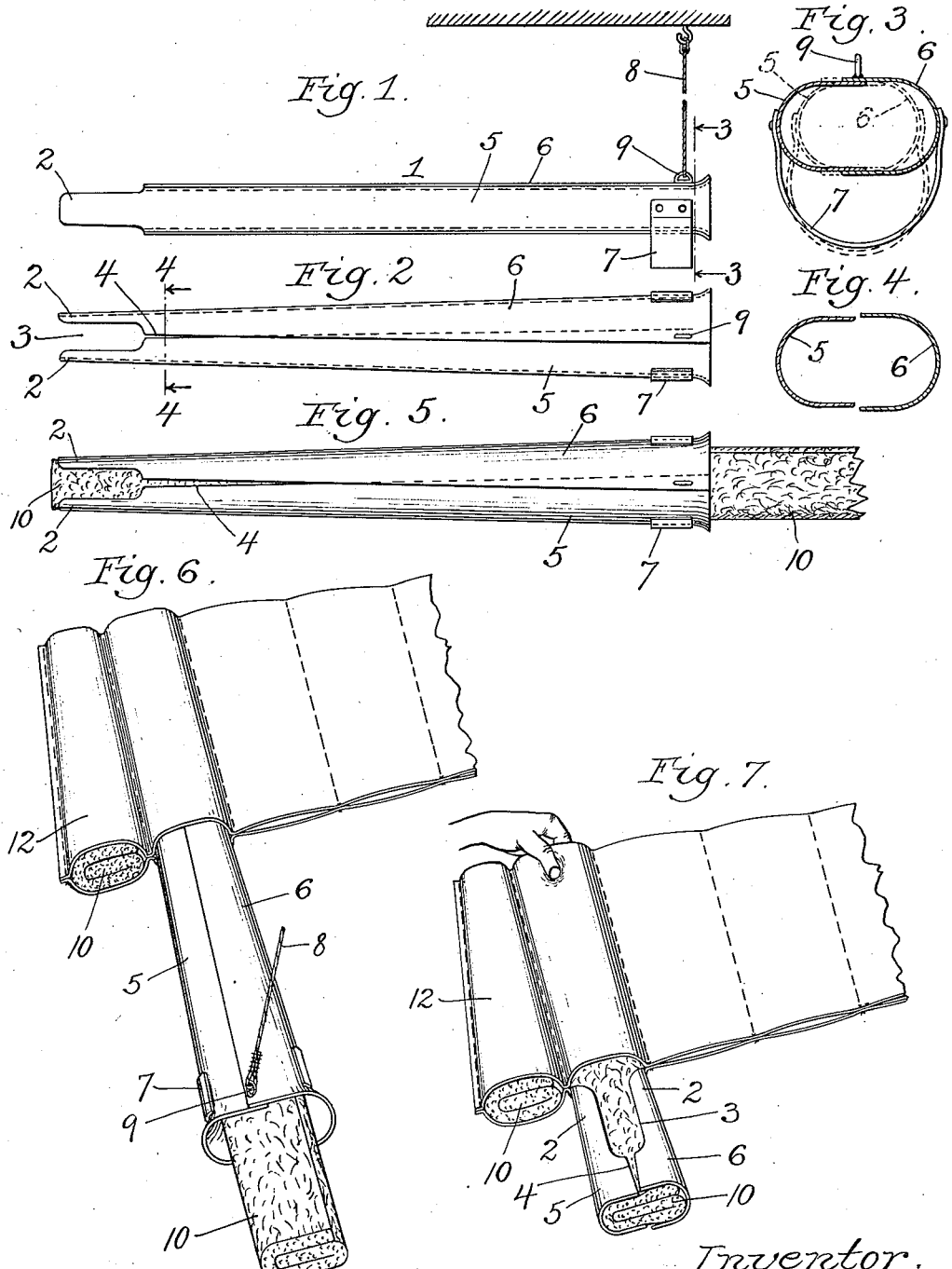

1,497,184

UNITED STATES PATENT OFFICE.

ALLISTER S. MITCHELL, OF OAKLAND, CALIFORNIA, ASSIGNOR TO CALIFORNIA COTTON MILLS, OF OAKLAND, CALIFORNIA, A CORPORATION OF CALIFORNIA.

APPARATUS FOR FORMING UPHOLSTERY.

Application filed February 8, 1923. Serial No. 617,886.

*To all whom it may concern:*

Be it known that I, ALLISTER S. MITCHELL, a citizen of the United States, residing at Oakland, in the county of Alameda and State of California, have invented a certain new and useful Improvement in Apparatus for Forming Upholstery, of which the following is a specification.

This invention relates to a new and improved process and apparatus for forming upholstery and has for its object to provide a new and improved process and apparatus of this description. The invention may be used in various ways and for different purposes. One of its principal uses is in connection with the cushions for automobiles. Such cushions are usually made up in the form of pleats or pipes generally by sewing or fastening two pieces of material together at intervals and these pleats or pipes are then filled with a soft padding of some kind generally made from cotton. One of the objects of the present invention is to provide a cheap, efficient and easily operated apparatus for filling these cushions and by means of which any suitable kind of filling may be inserted, the action of the device not depending upon any particular kind of filling material. The invention has other objects which are more particularly pointed out in the accompanying description.

Referring now to the drawings:

Fig. 1 is a side view showing one form of apparatus used in carrying out the process.

Fig. 2 is a plan view of the device illustrated in Fig. 1.

Fig. 3 is an enlarged end view as seen on the line 3—3 of Fig. 1.

Fig. 4 is an enlarged sectional view on the line 4—4 of Fig. 2.

Fig. 5 is a view similar to Fig. 2 showing filling material in the holder.

Fig. 6 is a perspective view showing a cushion partly filled and with the apparatus or tube partly inserted in one of the pleats.

Fig. 7 is a view similar to Fig. 6 after the tube has been withdrawn from the cushion pleat.

Like numerals refer to like parts throughout the several figures.

In carrying out the invention I provide a tube 1 into which the filling material is received. This tube is preferably cut away at one end so as to form the points or projections 2 with the space 3 between them. The points or projections 2 are preferably arranged so that they can be moved toward and from each other. This may be done by making an elongated slot in the tube as shown at 4 so that the points or projections 2 may be sprung towards the center. This is necessary in cases where the pleats are wedge shaped or smaller at one end than the other; such as shown for example on the left in Fig. 6. I prefer to make the tube 1 throughout its length of two sections 5 and 6. These sections preferably overlap at least for a portion of their length. Some means is provided for holding these sections in their separated position—that is, in an expanded position where the opening in the tube is larger than when the tube is pushed into the pleats or pockets of the cushion. For purposes of illustration I have shown a spring member 7 for this purpose. This member is connected to the two sections 5 and 6 and normally holds them in their expanded position. When the sections are grasped in the hand and squeezed they are brought to their contracted position as shown in dotted lines in Fig. 3, and when released they automatically expand to their expanded position, as shown in full lines in said figure.

In the use of the device it is preferably suspended at one end by a flexible suspending device 8 attached to a ring 9 connected to one of the sections. In the use of the device the filling 10 is made up in long pieces. They can be any desired length—several hundred feet if desired. This filling may be of any desired form and may be made of any desired material such as cotton. With this device it does not have to be reenforced in any manner. In the use of the device the end of the strip 10 is inserted when the sections are expanded, thus giving plenty of room for this insertion. The material is inserted so as to fill the tube as shown for example in Fig. 5. The tube is then grasped by the hand preferably near the connecting piece 7 and squeezed so as to bring the sections 5 and 6 in their contracted position. The end of the tube is then inserted in one of the pleats and the tube pushed completely into the pleat. The operator then takes his thumb and finger, as shown in Fig. 7, and presses the cover of the cushion at the point where the slot 3 in the tube is located, thus holding the filling 10. The tube is then withdrawn and slides along the strip 10 of filling material until the end reaches the position shown in Fig. 7. The two sections of the tube are then squeezed together and moved laterally so as to disconnect the portion of the filling in the tube from the portion in the pleat. The next pleat is then filled in the same way. It will thus be seen that the tube is self-filling. It will further be seen that the filling used need not have reenforcement of any kind because of the fact that the tube expands and contracts and the filling can be placed in it while it is expanded. The tube is then contracted upon the filling so as to compress it, the required amount and make the tube and the filling small enough to be pushed into the pleat. This construction greatly facilitates the insertion of the filling into the pleats and permits the filling to be inserted in wedge shaped or cone shaped pleats such as those shown at 12 in Figs. 6 and 7 for when the tube is inserted in such a pleat the ends automatically move towards each other under the pressure exerted by the pleat. The tube and the filling can thus be pushed into the end of the pleat so as to completely fill such pleat.

I claim:

1. An apparatus for forming upholstery comprising a tube for the filling material consisting of two sections placed side by side and overlapping, said sections adapted to be moved relatively to compress the filling therein so that it may be inserted in the upholstery pleat and spring means for automatically moving the sections away from each other to expand the tube when it is released.

2. An apparatus for forming upholstery comprising a tube for the filling material consisting of two sections placed side by side and overlapping, said sections adapted to be moved relatively to compress the filling therein so that it may be inserted in the upholstery pleat and means for automatically moving the sections away from each other to expand the tube when it is released.

3. An apparatus for forming upholstery comprising a tube for the filling material consisting of two sections placed side by side and overlapping, said sections adapted to be moved relatively to compress the filling therein so that it may be inserted in the upholstery pleat, a spring connecting the two sections and adapted to normally move them to their expanded position when the tube is released.

4. An apparatus for forming upholstery comprising a tube for the filling material consisting of two sections placed side by side and overlapping, said sections adapted to be moved relatively to compress the filling therein so that it may be inserted in the upholstery pleat and means for automatically moving the sections away from each other to expand the tube when it is released, but permitting their relative movement toward and from each other.

5. An apparatus for forming upholstery comprising a tube for the filling material, said tube consisting of two sections movable with relation to each other, said sections overlapping for a portion of their length leaving a slot between the adjacent edges for the remainder of their length.

6. An apparatus for forming upholstery comprising a tube for the filling material, said tube consisting of two sections movable with relation to each other, said sections overlapping for a portion of their length, and a connecting piece between the sections which holds them in an expanded position but with portions thereof still overlapping and permits the sections to move towards each other.

Signed at Chicago, county of Cook and State of Illinois, this 29th day of January, 1923.

ALLISTER S. MITCHELL.